United States Patent
Stevanovic et al.

(10) Patent No.: US 10,794,276 B2
(45) Date of Patent: Oct. 6, 2020

(54) ENERGY STORAGE VIA THERMAL RESERVOIRS AND AIR TURBINES

(71) Applicant: Karl Brotzmann Consulting GmbH, Amberg (DE)

(72) Inventors: Dragan Stevanovic, Sulzbach-Rosenberg (DE); Karl Brotzmann, Amberg (DE)

(73) Assignee: KARL BROTZMANN CONSULTING GMBH, Amberg (DE)

( * ) Notice: Subject to any disclaimer, the term of this patent is extended or adjusted under 35 U.S.C. 154(b) by 188 days.

(21) Appl. No.: 15/565,867

(22) PCT Filed: Apr. 13, 2015

(86) PCT No.: PCT/EP2015/000770
§ 371 (c)(1),
(2) Date: Oct. 11, 2017

(87) PCT Pub. No.: WO2016/165724
PCT Pub. Date: Oct. 20, 2016

(65) Prior Publication Data
US 2018/0106195 A1  Apr. 19, 2018

(51) Int. Cl.
*F02C 6/14* (2006.01)
*F02C 1/05* (2006.01)
(Continued)

(52) U.S. Cl.
CPC .......... *F02C 6/14* (2013.01); *F02C 1/05* (2013.01); *F28D 20/0056* (2013.01); *F02C 7/16* (2013.01);
(Continued)

(58) Field of Classification Search
CPC ...... F02C 6/14; F02C 1/05; F02C 7/22; F28D 20/0056
See application file for complete search history.

(56) References Cited

U.S. PATENT DOCUMENTS 5,690,164 A * 11/1997 Fassbinder .............. F28D 17/02
165/10
6,799,425 B2 * 10/2004 Emmel ..................... F02C 7/08
60/39.6

(Continued)

FOREIGN PATENT DOCUMENTS

DE    4236619 C2   11/1996
DE   10039246 C2    6/2002
(Continued)

OTHER PUBLICATIONS

English Translation WO-2009103106-A2 (Year: 2009).*
(Continued)

*Primary Examiner* — Shafiq Mian
(74) *Attorney, Agent, or Firm* — Insigne LLP

(57) ABSTRACT

The present invention relates to a process of storing energy through the conversion of thermal energy and subsequent power generation by means of a gas turbine set with compressor, expander and power generator, with at least one and with a second low-temperature reservoir, and a high-temperature reservoir with bulk material as the heat storage medium, the electric energy is stored in the form of high-temperature heat above the turbine outlet temperature in a thermal reservoir, that during the power generation phase a compressed gas from the compressor is heated in a low-temperature reservoir to a temperature near the turbine outlet temperature and subsequently heated in a high-temperature reservoir with stored heat from electric power to a temperature level of at least the turbine inlet temperature, and that the ratio between the bed height in flow direction and the mean particle diameter of the bulk material in the high-temperature reservoir is at least 10.

11 Claims, 7 Drawing Sheets

(51) Int. Cl.
*F28D 20/00* (2006.01)
*F02C 7/16* (2006.01)
*F02C 7/22* (2006.01)

(52) U.S. Cl.
CPC ............ *F02C 7/22* (2013.01); *F05D 2220/32* (2013.01); *F05D 2220/76* (2013.01); *F05D 2260/2214* (2013.01); *F05D 2260/42* (2013.01); *F05D 2300/30* (2013.01); *F05D 2300/5023* (2013.01)

(56) References Cited

U.S. PATENT DOCUMENTS

| | | | | |
|---|---|---|---|---|
| 8,381,544 B2* | 2/2013 | Coyle | .................... | F25J 3/0257 62/618 |
| 2007/0180998 A1* | 8/2007 | Arnold | ............... | B01D 53/0431 96/108 |
| 2011/0226447 A1* | 9/2011 | Mieda | .................... | F28D 7/022 165/104.12 |
| 2012/0137701 A1* | 6/2012 | Stevanovic | ............... | F02C 1/04 60/781 |
| 2012/0319410 A1* | 12/2012 | Ambrosek | ................ | F02C 1/05 290/1 R |
| 2014/0144603 A1* | 5/2014 | Watremetz | ............ | F28D 17/005 165/10 |

FOREIGN PATENT DOCUMENTS

| | | | | |
|---|---|---|---|---|
| DE | 102009018126 A1 | 10/2010 | | |
| DE | 102009038322 A1 | 2/2011 | | |
| DE | 102011117785 A1 | 5/2013 | | |
| DE | 102013004330 A1 | 8/2014 | | |
| EP | 0620909 B1 | 5/1996 | | |
| WO | 2009103106 A2 | 8/2009 | | |
| WO | WO-2009103106 A2 * | 8/2009 | ................ | F02C 1/04 |
| WO | 2013005192 A1 | 1/2013 | | |

OTHER PUBLICATIONS

English translation of International Search Report; PCT/EP2015/000770; dated Dec. 17, 2015.
Written Opinion of the International Search Authority; PCT/EP2015/000770; dated Dec. 17, 2015.

* cited by examiner

ENERGY STORAGE VIA THERMAL RESERVOIRS AND AIR TURBINES

The invention relates to a process in which electric energy in the form of high-temperature heat is stored and a gas is compressed as required, with which the stored heat is heated up and supplied to a gas turbine for power generation.

It is known that energy storage is a possibility of harmonizing the consumption and generation of electric power. In times when power production exceeds the power demand, excess power is stored, and when the power demand increases, the stored power is retrieved again. As our share of power derived from renewable energy sources increases, especially from wind and solar sources, this topic is gaining in importance because now, it is not only power consumption that is very uneven, but also power generation.

It is also known that energy storage, which depends on the energy supply and the energy demand in the power grid, can be very uneven. For example, a long discharge phase can follow a short storage phase or vice versa. It is also possible for several short charge and discharge phases to follow each other. An energy storage reservoir must be capable of fully meeting these conditions.

STATE OF THE ART

One known method is energy storage in reversible hydroelectric power plants, also known as pumped-storage power plants. Another version is to utilize two subterranean caverns at different depths as water reservoirs, such as described in DE102011117785.

Another technology that is also suited for large-scale energy storage is compressed-air energy storage (CAES). Air is compressed in an electrically powered compressor and stored in underground salt caverns. To discharge the energy afterwards, the compressed air is used to burn natural gas in a gas turbine. However, in this process, valuable fossil fuels (such as natural gas or kerosene) are used, and the air pressure is reduced during the discharge of compressed air from the compressed-air reservoir, which is a disadvantage for the gas turbine process. This reduces the overall degree of effectiveness of the process.

There are two possibilities of improving this principle. One is to position a compressed-air reservoir under a liquid column to hold the pressure constant (isobaric reservoirs). The other is to use an adiabatic air pressure reservoir that needs no additional fuel and has a considerably higher degree of efficiency. For this, a regenerative heat exchanger is used to cool the air after compression and later, during discharge, to use this stored heat to heat up the air again before it enters the turbine. However, the investment costs of such storage plants are very high.

A new alternative for energy storage is the so-called wind-gas process (originally described in DE102009018126A1). Excess power from the grid (not only wind energy) is used for producing hydrogen. The hydrogen is then used with carbon dioxide for methanation, and the methane obtained is stored in the gas grid. If necessary, this gas is used to generate power, for example with a gas turbine or a gas and steam cycle. This process is very complex and therefore inefficient (it consists of many process steps with local losses; the overall degree of effectiveness is between 14% and 26%). Investment costs are also very high.

WO 2009/103106A2 describes an arrangement for thermal storage, which can be used in a cycle with a gas turbine and a power generator. The storage medium is described as quartz-free stone. It is known from experience with similar systems such as recuperators for blast furnaces that the temperature drop in the operating phase is approximately linear.

Another means of thermal storage is described in DE 10 2013 004 330 A1. There, it is claimed that the thermal resistance for the electrical heating system must be at least 30% of the entire heating capacity. Apart from these rod-like thermal resistors, the remaining thermal storage medium consists of ceramic form elements which actually are also rods of square cross section. From this, it can be excepted, as above, that the temperature profile will be linear during a discharge phase.

The present patent application refers to a new process and corresponding means for energy storage with relatively low investment costs and a high degree of efficiency, whereby known and cost-effective components and technologies can be used and in which the temperature during the discharge phase in the high-temperature heat reservoir remains largely constant. This makes it possible for the outlet temperature from the reservoir to remain above the turbine inlet temperature (TIT) until the discharge is completed.

DESCRIPTION OF THE INVENTION

The present invention is based on the realization that such an advantageous temperature distribution is achieved when the thermal storage medium consists of bulk material particles in which the ratio between the bed height H in gas flow direction and the mean particle diameter d of the bulk material is at least 10, preferably at least 100, more preferably 250, even more preferably 500 and especially preferably 1000. The greater this ratio is, the greater is the pressure loss of the flowing gas. Since this gas only flows during a discharge phase through the reservoir, which is then under turbine pressure, the pressure loss is not unacceptably high even with a ratio of 1000. As a rule, the ratio between the bed height H in flow direction of the gas and the mean particle diameter d of the bulk material is not greater than 6000, preferably not greater than 3000.

Preferably, the maximum discharge time $\Delta t$ corresponds to the following relationship:

$$0.5 \cdot (M_s/m_G) \cdot (c_s/c_p) \cdot \Delta\theta \leq \Delta t \leq 0.99 \cdot (M_s/m_G) \cdot (c_s/c_p) \cdot \Delta\theta,$$

where
- $M_s$ is the mass of the bulk material,
- $m_G$ is the gas flow,
- $c_s$ is the specific thermal capacity of the bulk particles,
- $c_p$ is the specific thermal capacity of the gas,
- $\Delta\theta = (TPHE - TOT)/(TMAX - TOT)$ is the relative temperature difference,
- TPHE is the mean temperature of the gas at the outlet of the high-temperature reservoir,
- TMAX is the maximum temperature of the stored high-temperature heat,
- TOT is the temperature of the gas at the inlet of the high-temperature reservoir.

In this preferred embodiment, the high-temperature heat emitted by the gas from TOT to TPHE is between 50% and 99% of the maximum possible stored high-temperature heat while the difference remains almost completely in the bulk material.

The process according to the invention allows the development of a very advantageous temperature profile within the bed of bulk material such that the temperature changes relatively little at the outlet of the bulk bed while the temperature change in the middle of the bed is relatively high.

According to the invention, electric current is converted to high-temperature heat and stored in a thermal reservoir; when required, a gas is compressed, heated with the stored heat and fed to a gas turbine where power is generated with heat recuperation.

According to the invention, high-temperature heat generated with excess electric power is stored in a regenerator in the range between the inlet and outlet temperature of a gas turbine. Therefore, the total amount of heat that would be needed to reach the inlet temperature is not required. The remaining heat is only briefly stored in a system of 2 or more low-temperature heat reservoirs and discharged only during the time in which the gas turbine system is in operation and generating power. In this way, the storage capacity for the high-temperature heat can be reduced, as can be the investment costs for the high-value storage mass and the associated fireproof insulation. At the same time, the excess power is used only for high-temperature heat, which means that the overall effectiveness of the storage system is increased.

Preferably, the turbine inlet temperature TIT is in the range of 700° C. to 1300° C., more preferably in the range of 800° C. to 1100° C. and most preferably in the range of 900° C. to 1000° C.

Preferable, the turbine outlet temperature TOT is in the range of 400° C. to 750° C., more preferably in the range of 450° C. to 600° C., and most preferably in the range of 500° C. to 575° C. These are also the temperatures at which the gas usually enters the high-temperature reservoir.

Preferably, the maximum temperature of the stored heat in the high-temperature reservoir (TMAX) is in the range of 900° C. to 1500° C., more preferably in the range of 1000° C. to 1400° C. and most preferably in the range of 1050° C. to 1300° C.

The temperature difference between the mean temperature of the gas at the outlet of the high-temperature reservoir (TPHE) and the turbine outlet temperature (TOT) is usually between 50% and 99% of the maximum possible temperature difference (TMAX−TOT).

In another embodiment, the temperature difference between the mean temperature of the gas at the outlet from the high-temperature reservoir (TPHE) and the turbine outlet temperature (TOT) is usually between the maximum temperature of the stored high-temperature heat (TMAX) and the turbine outlet temperature (TOT).

In another embodiment of the invention, the heat reservoir is constructed such that it consists of several sequentially connected heating elements which are connected one by one. This allows a partial discharge in which heat is extracted only from one segment of the reservoir. The heat stored in the remaining part of the reservoir remains at a high-temperature level as before.

One operating mode according to the invention is that after a partial discharge, a subsequent loading phase affects only the segment that had been discharged before. This allows an adaptable, economic operating mode of the reservoir.

For the system of two or more low-temperature heat reservoirs, cheap heat storage fill material and insulation can be used. Furthermore, the storage time in this system (10 to 60 minutes) is clearly shorter which means that the storage capacity and thus also the investment costs can be held low.

To achieve a high degree of effectiveness for the storage systems, no highly developed gas turbine with bucket cooling is necessary, but a simple, robust turbine is sufficient, perhaps even with the radial design that is used for turbocharger technology. Of course, the optimal pressure conditions depend on the inlet temperature, but they are clearly lower (in the range from 2 to 7 times) than in the classical joule cycle without heat recovery.

Depending on the turbine construction and the process parameters, the overall degree of effectiveness (from power accumulation to power discharge or "round-trip efficiency") is 35% to 65%. With the models in the market today, an overall degree of effectiveness of up to 45% can be achieved. For even better values, an adapted construction and adapted process parameters are required, such as multiple intermediate cooling and higher inlet temperatures at lower pressure conditions.

If waste heat from the storage system can be used, the combined degree of effectiveness (power+heat) rises up to 90%.

Another advantage is the quick start-up capability of such a system. As soon as power is needed in the grid, full capacity is reached within a few minutes.

In an advantageous embodiment of the invention, a quick start-up capability of the system is achieved. At the end of a discharge phase, when the gas turbine is in operation and the high-temperature reservoir is under operating pressure, the respective valves of the system are closed in sequence such that the high-temperature reservoir and the turbine remain near operating pressure. In another discharge phase the turbine can start up much faster because not only high temperatures, but also the operating pressure are already available. The volume of the pressurized gas is sufficient until the compressor has reached its full capacity and its full pressure. In this way, the turbine for example can start in less than 30 seconds, also allowing participation in primary control power.

A system for the present invention consists of the following components and process steps:

Compressor for the compaction of the working medium (gas)

Gas turbine for the expansion of compressed and preheated working medium and performance of mechanical work Power generator for generating power from the net gain of mechanical work (difference between the power generated by the turbine and the power consumed by the compressor)

At least two low-temperature heat reservoirs for recuperation/utilization of the heat content of turbine waste gas Appropriate stone means for alternating between low-temperature reservoirs high-temperature reservoir for storing heat from excess power Waste gas stack.

In times of excess power in the grid, the high-temperature reservoir is heated with this power from the temperature level at the turbine outlet to the temperature level at the turbine inlet. Depending on the grid condition and the design capacity, this phase can take several minutes to several hours to several days. When power is needed again in the grid, the gas turbine set (compressor, expander, power generator) is started. In this, the compressed gas is first heated in a low-temperature reservoir up to turbine outlet temperature and subsequently heated in the high-temperature reservoir to turbine inlet temperature. This hot compressed gas relaxes in the turbine and during power generation. The relaxed gas still has a high heat content and is first cooled further in a second low-temperature reservoir. After some time, the first low-temperature reservoir is cooled and the second is heated up again such that a changeover takes place. These times are in the range of minutes or hours (usually between 10 and 60 minutes), depending on the design and operating parameters.

An excess power phase and a power generation phase do not necessarily have to follow each other directly—there can be up to several days between them.

FURTHER EMBODIMENTS OF THE INVENTION

In one advantageous embodiment of the invention, the ambient air is being used as the gaseous working medium. In special cases, another gas such as nitrogen or carbon dioxide can be used as well.

In a further development of the invention, the air preheated by compression flows through a gas cooler ahead of the first low-temperature reservoir. With this, the waste heat can be utilized for heating, for process heat or other purposes, and at the same time, the waste gas temperature and waste gas losses in the stack can be minimized.

In another advantageous embodiment, the gas can be conditioned by means of evaporative cooling with water injection instead of in a recuperative gas cooler. This increases the flow through the turbine and its performance, leaving more net performance for power generation. This has a substantial effect on the overall degree of effectiveness of the storage process.

In another advantageous embodiment, the inlet and the outlet to/from the high-temperature reservoir are connected with each other through a bypass line with a controllable valve, which means that the turbine inlet temperature can be regulated. This has two advantages: The turbine performance can be regulated, and heat can be stored in the high-temperature reservoir at temperatures that are higher than the turbine inlet temperature. The second advantage means higher storage capacity with the same dimensions and mass for the reservoir, and thus lower specific investment costs.

In another advantageous further development of the invention, a fuel supply is provided downstream from the outlet of the high-temperature reservoir, which means that a relatively small volume of natural gas or another gaseous or liquid fuel can be added to increase the gas temperature ahead of the turbine inlet. In this way, power can be generated longer than planned if the grid conditions demand it, in spite of the greater gas temperature drop at the outlet of the high-temperature reservoir.

It is advantageous to use three or more low-temperature reservoirs to allow a soft changeover between two operating phases without a power surge. The number of reservoirs depends on the system's operating pressure and capacity. With several reservoirs, the pressure loss in both operating phases can be compensated for, such that in the phase with low operating pressure, more than one unit is engaged which means a corresponding reduction of the flow through each unit and an extension of the phase period. Such changeover processes are already known from DE 100 39 246 C2 or DE 10 2009 038 322 A1.

For systems of very large energy storage capacity, it is an advantage to install several high-temperature reservoirs to reduce the dimensions of all units and to minimize investment costs. In this case, additional changeover means are needed between high-temperature reservoirs. Advantageously these changeover means are placed ahead of (and not after) the individual high-temperature reservoirs where the temperatures are distinctly lower. This can save investment costs and also extend the life expectancy of these organs.

Low-temperature reservoirs are also suitable for releasing stored thermal energy, such as in the form of warm air. Due to their low investment costs and their very good heat transfer, bulk material generators are particularly practical low-temperature reservoirs. In particular, bulk material regenerators can be used that are known from EP 0620 909 B1 or DE 42 36 619 C2. Unadulterated material such as gravel, Eifel Lava or lime chippings is used as a heat storage mass for the low-temperature reservoirs.

High-temperature reservoirs are also suitable for releasing the stored thermal energy, for example in the form of hot air. Special bulk material regenerators are suited as a high-temperature reservoir. Bulk material regenerators known from EP 0620 909 B1 or DE 42 36 619 C2 can also be employed. However due to the higher temperatures, also on the cold sides of the regenerator, a simpler design is more suitable. For example, the bulk material bed can be formed such that the bulk material is arranged in a column, which can be vertical or horizontal.

Preferably, the bulk material for the high-temperature heat reservoir consists of ceramics, aluminum oxide, refractory clay, silicon carbide, zirconium oxide, graphite, lava stone, gravel, iron ore, limestone, metallic particles, or combinations thereof. The particles of the bulk material can be spherical and/or in broken or crushed form. It is advantageous when the particles are of approximately the same shape.

The mean particle diameter of the bulk material should not be greater than 50 mm, preferably not greater than 40 mm, more preferably not greater than 30 mm and most preferably not greater than 15 mm.

Usually, the mean particle diameter of the bulk material is at least 2 mm, preferable at least 5 mm, more preferably at least 7 mm, most preferably at least 10 mm.

Preferably, the heating elements for the conversion of electric energy into heat, which happens in the high-temperature reservoir, are directly inserted in the bulk material, for example in the form of spirals arranged above each other. The horizontal distance between the wires in a spiral must be about the same as the vertical distance between two spirals, to allow an even heat transfer.

To achieve the desired electrical performance and a nominal heat release from the wire surface, an optimal ratio between the specific wire resistance, wire diameter and overall length of the spiral must be ensured. It will be advantageous to connect several or all spirals in one high-temperature reservoir with each other to increase the length of the line.

The material for the heating wire can be stainless steel or heat-resistant steel depending on the temperature and the gas/working medium used.

BRIEF DESCRIPTION OF THE DRAWINGS

Below, the advantages of the inventions are explained and described as embodiments with reference to the figures, where.

DETAILED DESCRIPTION

Figure 1:
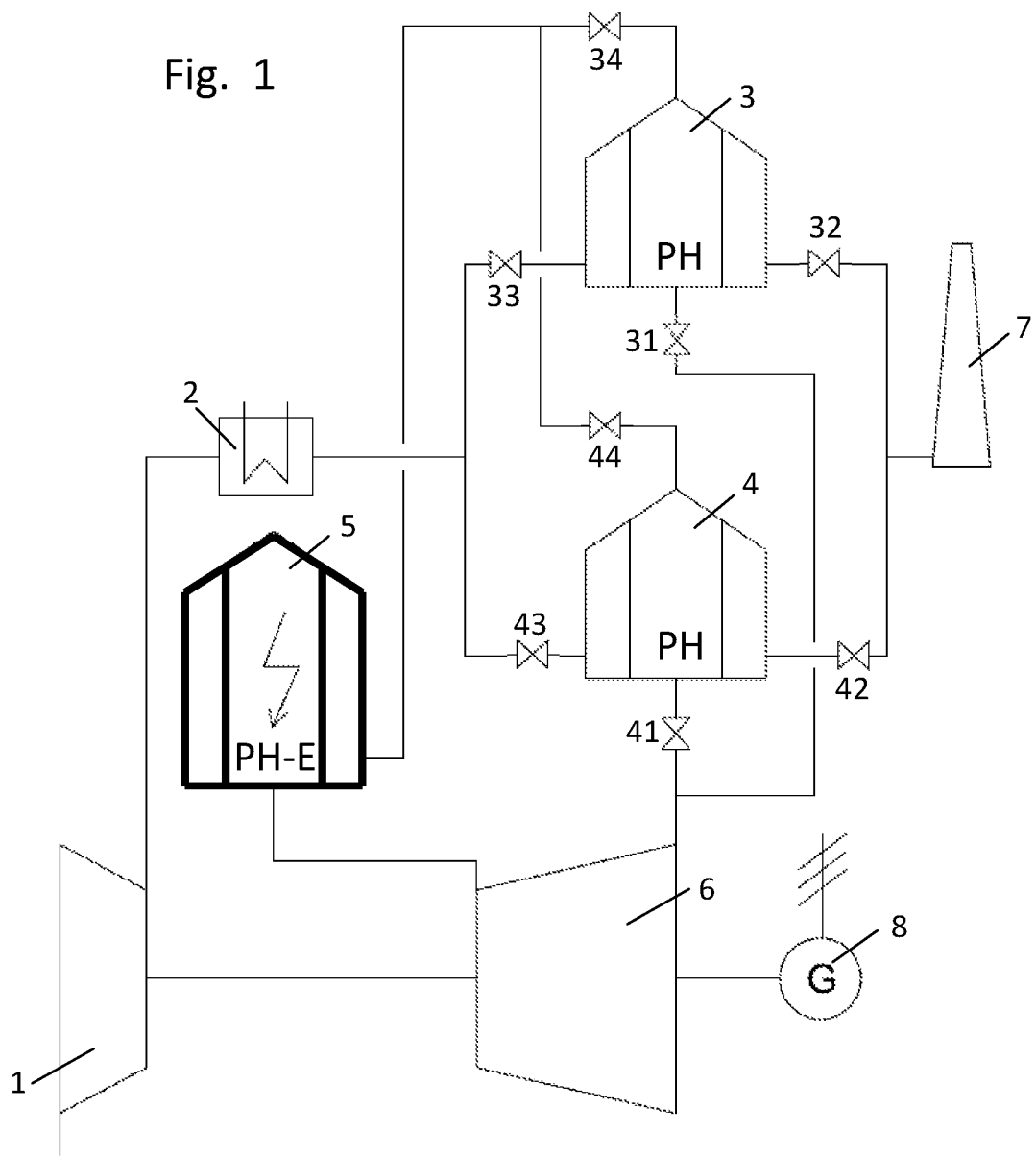
FIG. 1 shows a schematic block diagram with all main components of the system and their connections.

FIG. 1 shows a schematic flow diagram of the system for the thermal storage of excess power and its regeneration when there is a lack of power in the grid. This system comprises a gas turbine set with compressor 1, turbine 6 and power generator 8, a high-temperature reservoir 5, two smaller low-temperature reservoirs 3, 4 with corresponding changeover means 31-34 and 41-44, a gas cooler 2 and a discharge stack 7.

During a power storage phase, the high-temperature reservoir 5 is heated with power of turbine outlet temperature TOT to at least the turbine inlet temperature TIT. This conversion from electric to thermal energy can be achieved via current resistance or induction. This phase can last several minutes, hours or days, depending on demand in the grid and on the design of the components.

Figure 2B:
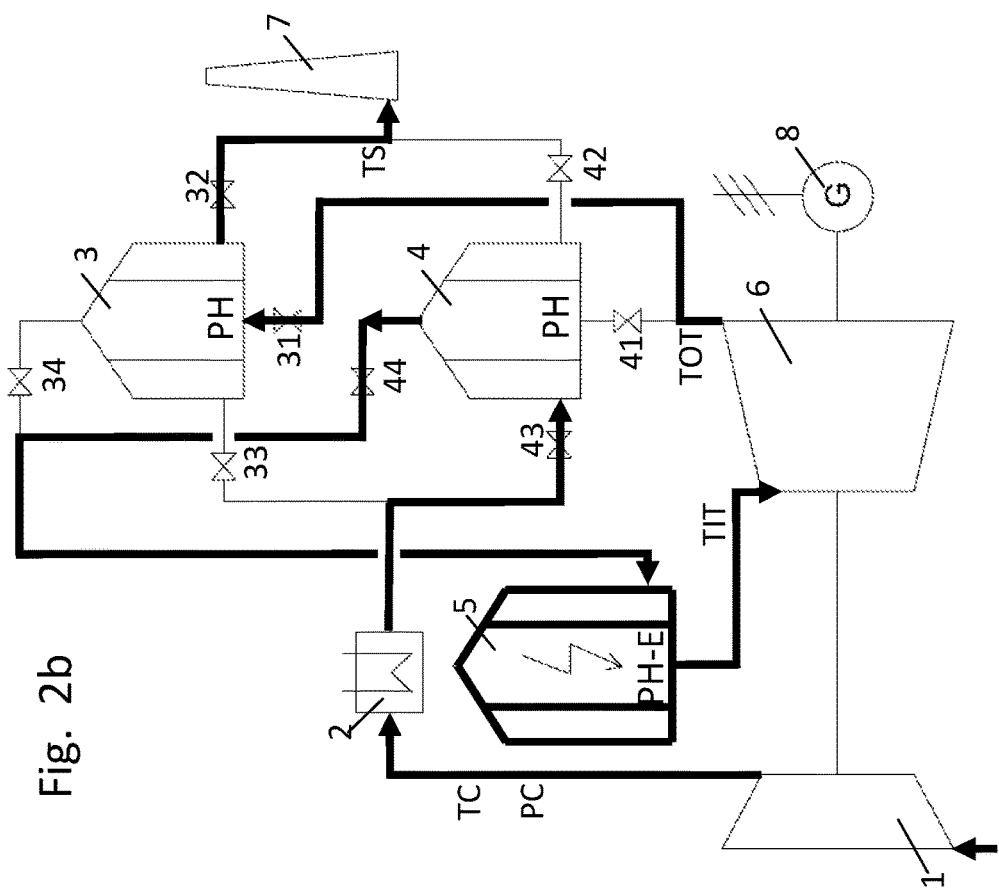
FIG. 2a and FIG. 2b show the same block diagram as in FIG. 1, but with the flow paths of the gas shown during the power generation phases.
Figure 2A:
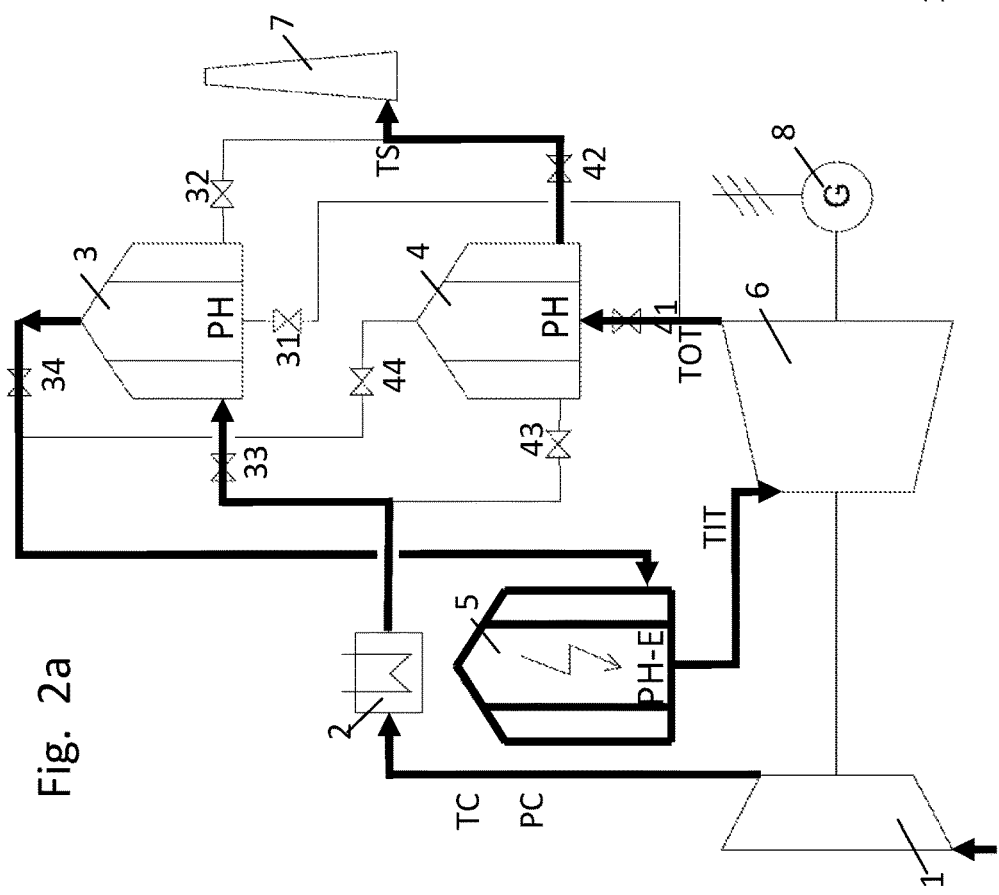

FIG. 2a shows the flow paths of the gas in the power generation phase. In compressor 1 the ambient air is compressed to pressure PC and thus heated to temperature TC, which is clearly above the ambient temperature. To utilize this heat and at the same time to minimize losses through the stack, the compressed air is cooled in gas cooler 2, and heat generated is used for heating or other purposes. When the changeover means 33 and 34 are opened, the cooled air flows through a first low-temperature reservoir 3, where it is heated by stored heat close to the turbine outlet temperature TOT, but clearly higher than TC. The thus pre-heated air flows through the high-temperature reservoir 5, where its temperature—thanks to the stored high-temperature heat of electrical origin—rises to at least the turbine inlet temperature TIT. Compressed air at a temperature TIT enters turbine 6 where the expansion to ambient pressure occurs, causing the temperature to drop to TOT. Since the changeover means 41 and 42 are also opened, the relaxed air flows through a second low-temperature reservoir 4, gives off its heat to the stored mass, cools down to temperature TS and leaves the system through a stack 7.

After a certain time, as a rule between 10 and 60 minutes, the changeover means 33, 34, 41 and 42 close and the changeover means 31, 32, 43 and 44 open, such that the low-temperature reservoirs 3 and 4 change roles, as shown in FIG. 2b.

Instead of cooling the compressed air in a convective heat exchanger 2, water can be injected and cooled by means of water evaporation. With this, the possibility is lost to utilize the waste heat that develops, but at the same time, the mass flow through turbine 6 and thus the performance is increased, and especially the overall degree of effectiveness of the process.

Figure 3B:
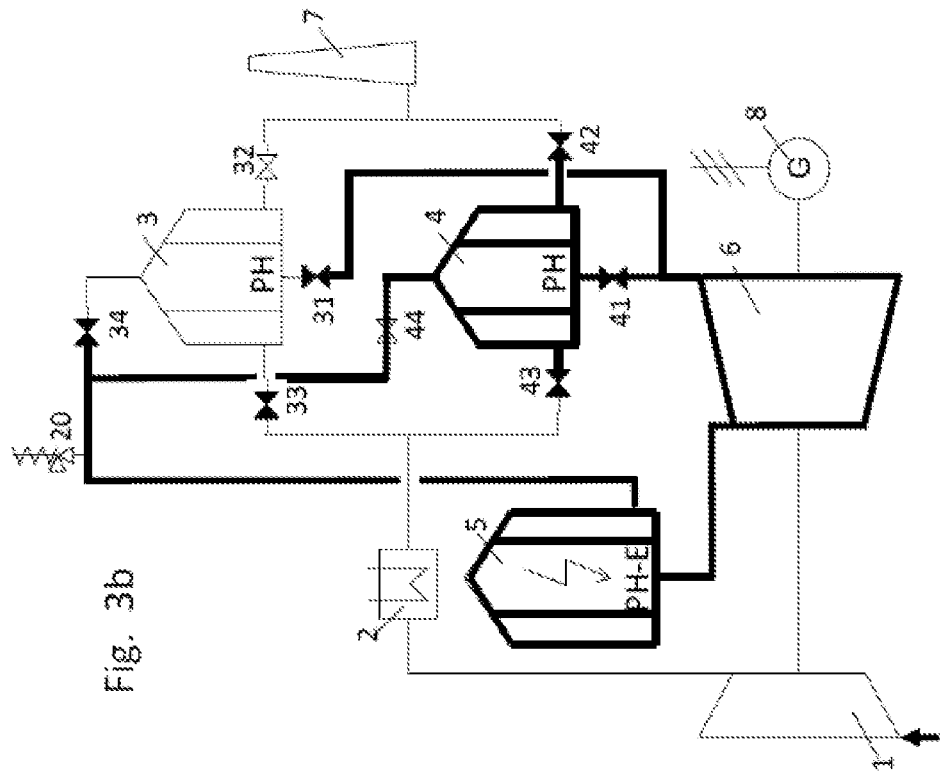
FIG. 3a, 3b show a schematic block diagram of the process indicating the volume in which the operating medium is stored during the turbine standstill.
Figure 3A:
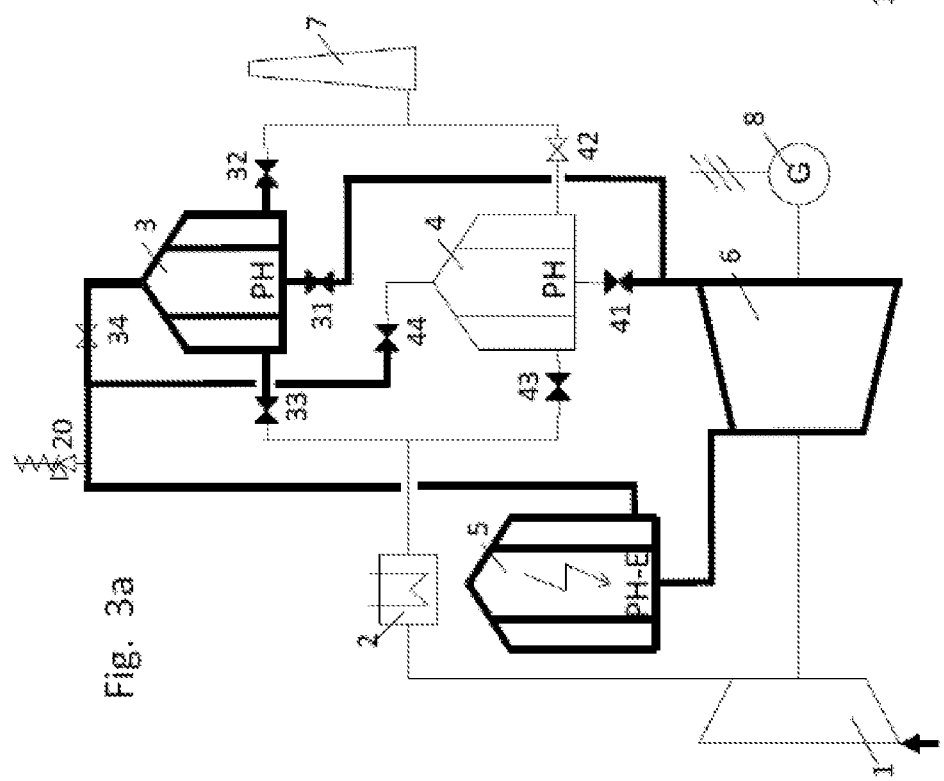

FIG. 3a and FIG. 3b show an advantageous operating mode of this system which results in a quick start-up ability. At the end of a discharge phase, when gas turbine 6 is in operation, the high-temperature reservoir 5 is under operating pressure, and while the low-temperature reservoir 3 is under pressure (FIG. 3a), the valves 41 and 33 are slowly closed in that order, such that the high-temperature reservoir 5, the low-temperature reservoir 3 and turbine 6 remain near operating pressure. Should at the end of a discharge phase the low-temperature reservoir 4 be under pressure (FIG. 3b), the same happens with valves 31 and 43, with the result that now the high-temperature reservoir 5, the low-temperature reservoir 3 and turbine 6 remain under near operating pressure.

The control variable for valves 41 and 31 will be the maximum operating pressure of the turbine. One of the two valves is closed until that pressure is reached. If this pressure is reached or exceeded before the respective valve is fully closed, the valve will stay in position until the pressure falls below operating pressure again.

In valves 33 and 43 the control variable is the pressure difference. One of the two valves is closed until the difference between the pressure after compressor 1 and the operating pressure of the turbines 6 is as small as possible. If the pressure after the compressor is greater than the operating pressure, the valves will remain in position until the pressure begins to drop again.

When all these valves are closed, the operating medium or air is stored under operating pressure in the volume between. In FIGS. 3a and 3b this volume is shown as bold likes. If the heating elements 12, 13 and/or 14 (see FIG. 5) are turned on again, the mean temperature rises in this closed volume, and thus also the pressure. That is why it is necessary to install an additional safety valve 20. Safety valve 20 can also be installed at the outlet of turbine 6 to better maintain the temperature there and to facilitate a smoother new start-up.

In a news discharge phase (see FIG. 3a) valve 41 will open slowly such that turbine 6 begins to rotate and to drive compressor 1. When compressor 1 delivers sufficiently high pressure, valve 33 will open as well, such that a nominal turbine operation can follow.

In case of conditions as in FIG. 3b, valve 31 will open first followed by valve 43. In this way, the turbine start-up—in both cases shown in the drawings—will also be in under 30 seconds, which is necessary for participation in primary standard performance.

Figure 4:
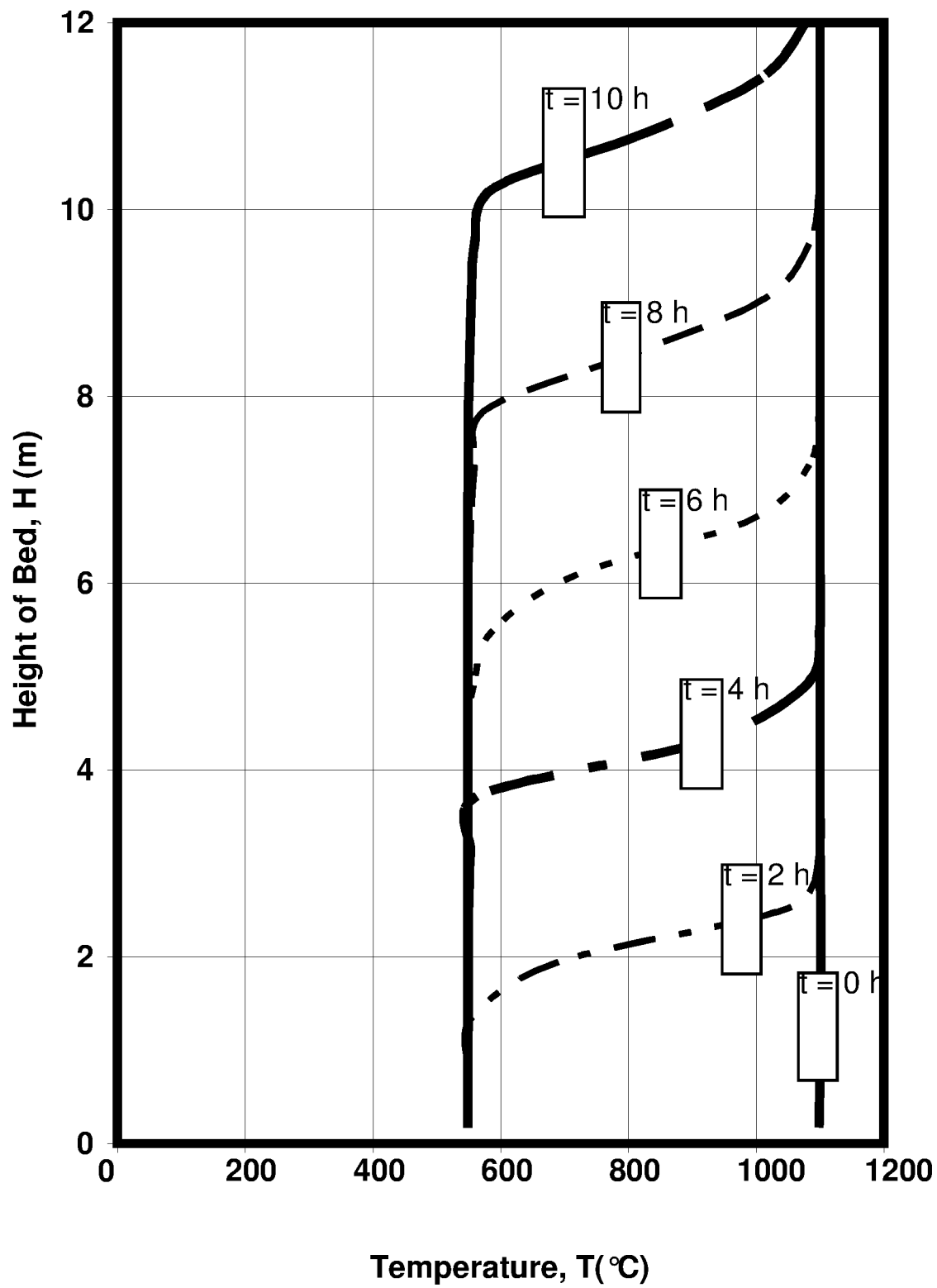
FIG. 4 shows an advantageous temperature distribution during a discharge phase in a bulk material with a bed height/particle diameter ratio of 1000.

FIG. 4 shows the advantageous S-shaped temperature profiles during the discharge of a 1 high-temperature reservoir 12 m in height, with 12 mm aluminum oxide balls as a bulk material. Here, the H/d ratio is 1000. At maximum storage, there is an even temperature of 1100° C. (t=0 h) in the heat reservoir. The discharge phase begins when the air heated to 550° C. enters from below, is heated up to 1100° C. and leaves the heat reservoir from the top in the direction of a gas turbine. Outside the reservoir, it mixes with an approximately same volume of air pre-heated to 550° C. to reach the right turbine inlet temperature (TIT) of such as 830° C. After a discharge period of two hours, the temperature in the bulk material above 3 m remains constant at 1100° C. between a height of 1 m and 3 m, there is a very steep temperature profile. After 4, 6 and 8 hours it is very similar, but the incline of the profile drops slightly. After 10 hours of uninterrupted discharge, the outlet temperature drops slightly to below 1100° C., but it still remains above the inlet temperature, which is usually between 830° C. and 970° C. Without such a favourable temperature profile, which is achieved due to the above described characteristics of the bulk material bed, the outlet temperature drops much more quickly and finally forms a linear temperature profile. The discharge phase must be ended when the outlet temperature drops below the turbine inlet temperature although there is still high-temperature heat in the reservoir.

Figure 5:
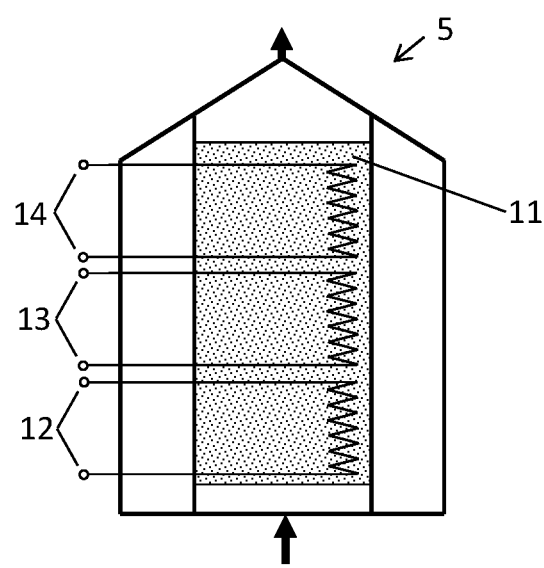
FIG. 5 shows an advantageous embodiment of electrical heating in three different segments of the bulk material.

If the discharge time is shorter than 10 hours, such as 2 or 4 hours, it is not useful to heat the upper segments of reservoir 5 since this can lead the overheating of these zones or damage the heating elements. It is then advantageous to distribute several heating elements operated independently of each other throughout the entire height. As an example, FIG. 5 shows 3 such heating elements 12, 13 and 14. After a discharge phase of less than 4 hours, it is then sufficient when only the bottom heating element 12 is turned on during a loading phase. After a discharge phase of up to 8 hours, the two lower heating elements 12, 13 are turned on, and only with a complete discharge of the storage medium 11 in reservoir 5 are all three heating elements 12, 13, 14 put in operation. For such an operating mode, the above mentioned S-shaped temperature profile is not only advantageous but essential.

Figure 6:
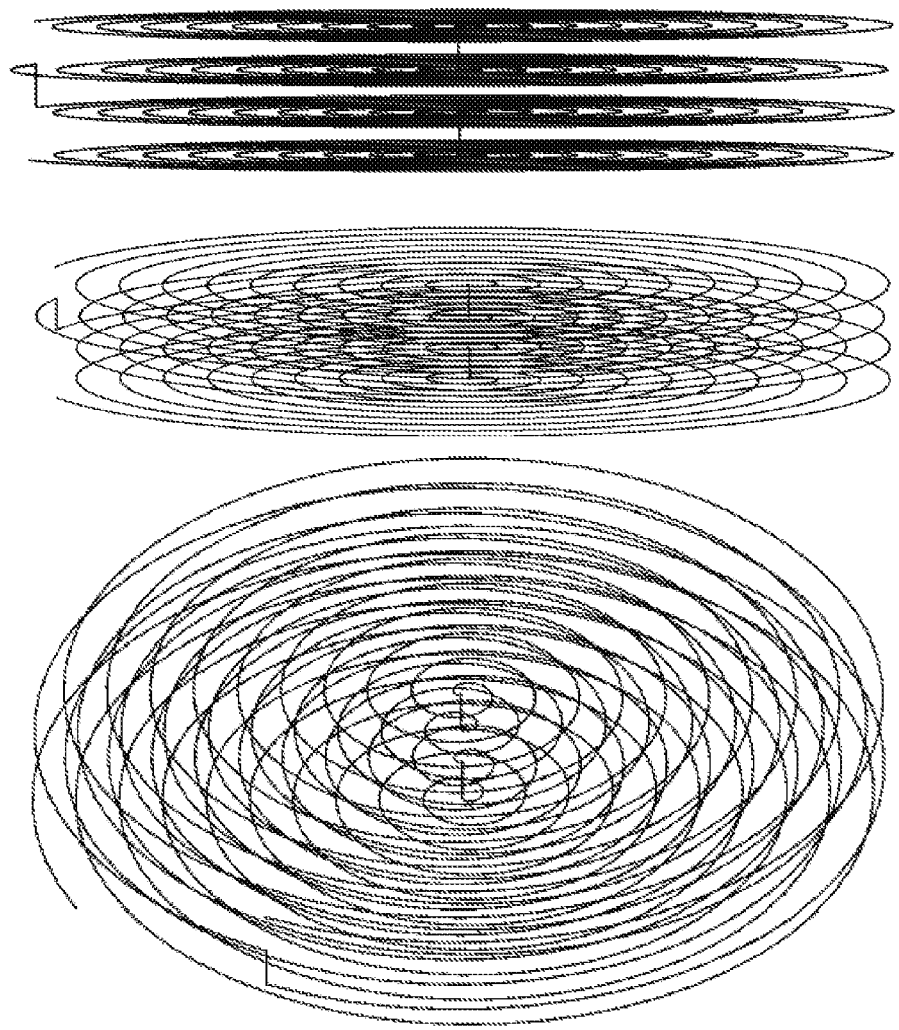
FIG. 6 shows the heating elements in high-temperature reservoir 5 in the form of stacked and connected spirals.

A possible advantageous embodiment of electrical heating elements in the form of stacked inter-connected spirals is shown in FIG. 6. This arrangement is particularly advantageous for the bulk material s heat storage mass because it can distribute freely and evenly all around the spirals. To increase the overall length of the heating lines, the spirals are connected with other in the middle or at the end. Here, as an example, four spirals are shown in three different perspectives to better illustrate the said connection sites.

Figure 7:
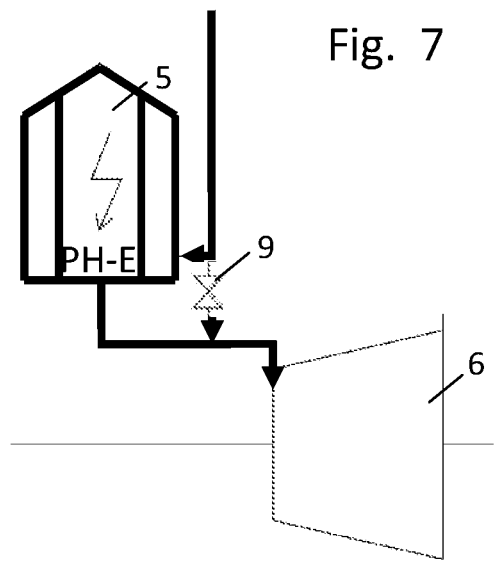
FIG. 7 shows the bypass line with bypass valve 9.

FIG. 7 shows a bypass line with a bypass valve 9 to bypass the high-temperature reservoir 5 with a partial stream, to obtain a turbine inlet temperature TIT that is lower than the outlet temperature from the high-temperature reservoir 5. In this manner, even higher temperatures can be stored in the high-temperature reservoir 5 and such increase its heat capacity. In addition, the performance of turbine 6 can be regulated with bypass valve 9.

Figure 8:
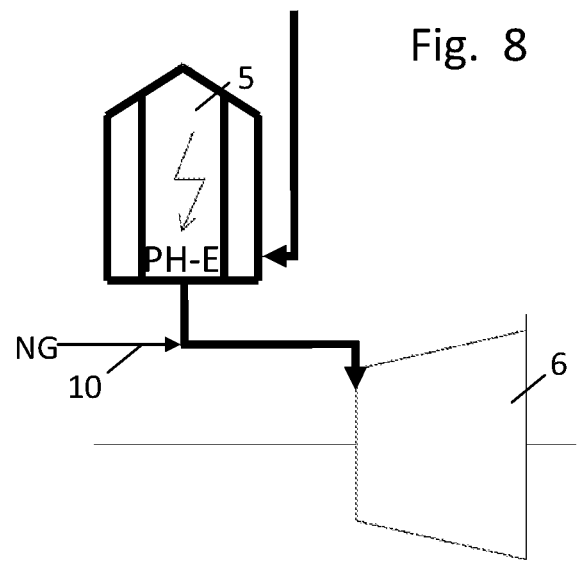
FIG. 8 shows the supply of natural gas NG or other gaseous or liquid fuels 10.

FIG. 8 shows the possibility to use a line 10 to add a volume of natural gas NG or other gaseous or liquid fuel into the line between the high-temperature reservoir 5 and turbine 6 to achieve a higher turbine inlet temperature TIT. This is of interest when the discharge time is longer than planned due to conditions in the power grid, and if the air temperature from the high-temperature reservoir drops below the nominal turbine inlet temperature TIT.

All characteristics disclosed in the application documents are claimed as relevant for the invention if alone or in combination they are novel in relation to the state of the art.

REFERENCE NUMBERS

1 Compressor
2 Heat exchanger, gas cooler
3 First low-temperature reservoir
4 Second low-temperature reservoir
5 High-temperature reservoir, electrically heated
6 Turbine, Gas expander
7 Stack
8 Power generator
9 Bypass line with bypass valve
10 Supply of natural gas or another gaseous or liquid fuel
11 Heat storage medium for the high-temperature reservoir
12 First (bottom) heating element
13 Second (intermediate) heating element
14 Third (top) heating element
20 Safety valve (pressure relief valve)
31, 32, 33, 34 Changeover means in the first low-temperature reservoir
41, 42, 43, 44 Changeover means in the second low-temperature reservoir
PH-E Electrically heated high-temperature reservoir
PH Low-temperature reservoir
PC Pressure after the compressor
TC Temperature after the compressor
TIT Turbine inlet temperature
TOT Turbine outlet temperature
TMAX Maximum temperature of the stored high-temperature heat
TPHE Mean temperature of the gas at the outlet from the high-temperature reservoir
TS Temperature in the stack
NG Natural gas or another gaseous or liquid fuel

The invention claimed is:

1. A process to store energy through conversion into thermal energy and subsequent power generation by means of:
   a gas turbine set with compressor, gas turbine and power generator,
   with at least a first and a second low-temperature reservoirs, and
   a high-temperature reservoir with bulk material as the heat storage medium;
   wherein the process comprising:
   electric energy is stored in the form of high-temperature heat, at a temperature higher than a gas turbine outlet temperature in a high-temperature reservoir, that during a power generation phase a compressed gas from the compressor is heated in the at least the first and the second low-temperature reservoirs to a temperature near the gas turbine outlet temperature and then heated in the high-temperature reservoir with stored heat from the gas turbine outlet temperature which is temperature of the gas at an inlet of the high temperature reservoir to a temperature level of at least a gas turbine inlet temperature of the gas and that a ratio between a bed height in flow direction and a mean particle diameter of the bulk material in the high-temperature reservoir is at least 10, and
   at end of a discharge phase, before the gas turbine comes to a standstill, a first pair of valves or second pair of valves, are closed in such a manner that the high-temperature reservoir, the at least the first and the second low-temperature reservoirs and the gas turbine are remaining near operating pressure.

2. The process according to claim 1, further comprising, discharge time Δt from the high-temperature reservoir corresponds to the following relationship:

$$0.5 \cdot (Ms/mG) \cdot (Cs/Cp) \cdot \Delta\theta < \Delta t < 0.99 \cdot (Ms/mG) \cdot (Cs/Cp) \cdot \Delta\theta$$

where Ms is mass of the bulk material, $m_G$ is gas flow, $c_s$ is specific heat capacity of bulk material particles, $C_p$ is specific heat capacity of the gas, $\Delta\Theta=(TPHE-TOT)/(TMAX-TOT)$ is relative temperature difference, where, TPHE is a mean temperature of the gas at an outlet of the high-temperature reservoir, TMAX is a maximum temperature of the stored high-temperature heat, and TOT is the turbine outlet temperature.

3. The process according to claim 1, further comprising, cooling in the high-temperature reservoir during a power generation phase is limited only to the gas turbine outlet temperature.

4. The process according to claim 1, wherein the compressed gas is fed to a heat exchanger to utilize waste heat that has developed as useful heat.

5. The process according to claim 1, wherein the compressed gas is cooled through injection of water.

6. The process according to claim 1, wherein the high-temperature reservoir is heated by the turbine outlet temperature to a temperature above the gas turbine inlet temperature.

7. The process according to claim 1, further comprising, conversion of electric energy to high-temperature heat for the high temperature reservoir takes place via current resistance or induction.

8. The process according to claim 1, further comprising, electric heating of the high-temperature reservoir takes place in at least two segments distributed throughout the overall height.

9. The process according to claim 1, further comprising, by means of a bypass line and a bypass valve the turbine inlet temperature and the gas turbine performance can be selectively controlled.

10. The process according to claim 1, wherein during the power generation phase, the compressed gas that serves as working medium is air or another oxygen containing gas.

11. The process according to claim 1, further comprising, adding a volume of natural gas or other gaseous or liquid fuel into a line between the high-temperature reservoir and the gas turbine.

\* \* \* \* \*